(12) United States Patent
Lee et al.

(10) Patent No.: US 12,248,763 B2
(45) Date of Patent: Mar. 11, 2025

(54) ARITHMETIC DEVICES FOR NEURAL NETWORK

(71) Applicant: SK hynix Inc., Icheon-si (KR)

(72) Inventors: Seung Yong Lee, Icheon-si (KR); Eui Cheol Lim, Icheon-si (KR); Choung Ki Song, Yongin-si (KR); Myoung Seo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 1036 days.

(21) Appl. No.: 17/145,801

(22) Filed: Jan. 11, 2021

(65) Prior Publication Data

US 2021/0132910 A1 May 6, 2021

Related U.S. Application Data

(63) Continuation-in-part of application No. 16/932,400, filed on Jul. 17, 2020, now Pat. No. 12,014,184, (Continued)

(30) Foreign Application Priority Data

Oct. 31, 2019 (KR) .................. 10-2019-0138114
Dec. 4, 2019 (KR) .................. 10-2019-0160238

(51) Int. Cl.
*G06F 7/544* (2006.01)
*G06F 1/03* (2006.01)
(Continued)

(52) U.S. Cl.
CPC .......... *G06F 7/5443* (2013.01); *G06N 3/048* (2023.01); *G06N 3/063* (2013.01); *G06F 1/03* (2013.01); *G06F 2207/4824* (2013.01)

(58) Field of Classification Search
CPC .. G06F 7/5443; G06F 1/03; G06F 2207/4824; G06F 17/153; G06F 17/156; G06N 3/048; G06N 3/063
See application file for complete search history.

(56) References Cited

U.S. PATENT DOCUMENTS 5,181,184 A 1/1993 Shim et al.
6,414,687 B1 7/2002 Gibson
(Continued)

FOREIGN PATENT DOCUMENTS

CN 108736876 A 11/2018
DE 19942144 A1 6/2001
(Continued)

OTHER PUBLICATIONS

F. Piazza et al., Neural Networks with Digital LUT Activation Functions, Proceedings of 1993 International Joint Conference on Neural Networks, IEEE, 1993 (Year: 1993).*

(Continued)

*Primary Examiner* — Emily E Larocque
(74) *Attorney, Agent, or Firm* — William Park & Associates Ltd.

(57) ABSTRACT

An arithmetic device includes a multiplying-accumulating (MAC) operator and an activation function (AF) circuit. The MAC operator performs a MAC arithmetic operation for weight data and vector data to generate an arithmetic result signal. The AF circuit stores a look-up table for an activation function, adjusts a number of logic level combinations of an input distribution signal that correspond to each logic level combination of the output distribution signal, among a plurality of logic level combinations of the output distribution signal, based on an input range of the activation function. The AF circuit selects and outputs the output distribution signal that corresponds to the input distribution signal based on the look-up table. The input range of the (Continued)

activation function is based on a relative number of errors that occur.

24 Claims, 27 Drawing Sheets

Related U.S. Application Data which is a continuation-in-part of application No. 16/919,786, filed on Jul. 2, 2020, now Pat. No. 11,915,125.

(60) Provisional application No. 62/959,593, filed on Jan. 10, 2020, provisional application No. 62/959,574, filed on Jan. 10, 2020, provisional application No. 62/958,609, filed on Jan. 8, 2020, provisional application No. 62/958,614, filed on Jan. 8, 2020.

(51) Int. Cl.
  *G06N 3/048* (2023.01)
  *G06N 3/063* (2023.01)

(56) References Cited

U.S. PATENT DOCUMENTS

| | | | |
|---|---|---|---|
| RE42,643 E | 8/2011 | Oshima et al. | |
| 9,559,836 B1 | 1/2017 | Hata | |
| 10,592,247 B2 | 3/2020 | Tanaka | |
| 2013/0041859 A1 | 2/2013 | Esterlilne | |
| 2014/0376676 A1 | 12/2014 | Schafferer | |
| 2017/0365306 A1 | 12/2017 | Ouyang et al. | |
| 2018/0373977 A1 | 12/2018 | Carbon et al. | |
| 2019/0042922 A1 | 2/2019 | Pillai et al. | |
| 2019/0080223 A1 | 3/2019 | Fraser et al. | |
| 2019/0147323 A1 | 5/2019 | Li et al. | |
| 2019/0149315 A1 | 5/2019 | Suzuki et al. | |
| 2021/0004208 A1 | 1/2021 | Lai et al. | |
| 2021/0365241 A1 | 11/2021 | Huang et al. | |
| 2022/0276837 A1 | 9/2022 | Fujinami | |

FOREIGN PATENT DOCUMENTS

| | | | |
|---|---|---|---|
| EP | 0575716 A1 | 12/1993 | |
| GB | 2234374 A | 1/1991 | |
| JP | 2010050609 A | 3/2010 | |
| KR | 1020180053314 A | 5/2018 | |
| KR | 20180070187 A | 6/2018 | |
| KR | 1020190054454 A | 5/2019 | |
| KR | 102032146 B1 | 10/2019 | |
| KR | 1020190116024 A | 10/2019 | |

OTHER PUBLICATIONS

P.K. Meher, An Optimized Lookup-Table for the Evaluation of Sigmoid Function for Artificial Neural Networks, IEEE 2010 (Year: 2010).*

B. Zamanlooy et al., Efficient VLSI Implementation of Neural Networks with Hyperbolic Tangent Activation Function, IEEE Transactions on very large scale integration (VLSI) Systems, vol. 22, No. 1, 2014 (Year: 2014).*

\* cited by examiner

FIG.14

| IDST<4:1> | ODST |
|---|---|
| '0001' ('1') | Y1 |
| '0010' ('2') | Y2 |
| ⋮ | ⋮ |
| '1001' ('9') | Y9 (ODST1) |
| '1010' ('10') | Y10 (ODST2) |
| ⋮ | ⋮ |
| '1111' ('15') | Y15 |

FIG.19

| IDST | TI |
|---|---|
| IDST(1) | TI<1> |
| IDST(2) | TI<2> |
| IDST(3) | TI<3> |
| IDST(4) | TI<4> |
| ⋮ | ⋮ |
| IDST(L) | TI<L> |

FIG.20

| TI | ODST | INPUT RANGE |
|---|---|---|
| TI<1> | ODST(1) | R1 |
| TI<2> | | |
| TI<3> | | |
| TI<4> | | |
| TI<5> | ODST(2) | |
| TI<6> | | |
| TI<7> | | |
| TI<8> | | |
| ⋮ | ⋮ | |
| TI<4M-3> | ODST(M) | |
| TI<4M-2> | | |
| TI<4M-1> | | |
| TI<4M> | | |
| TI<4M+1> | ODST(M+1) | R2 |
| TI<4M+2> | ODST(M+2) | |
| ⋮ | ⋮ | |
| TI<4M+N> | ODST(M+N) | |

FIG.22

| INPUT RANGE | TI | ODST |
|---|---|---|
| R1<br>(-8 ≤ INPUT < -4) | TI<1> | ODST(1) |
| | TI<2> | |
| | TI<3> | ODST(2) |
| | TI<4> | |
| R2<br>(-4 ≤ INPUT < 4) | TI<5> | ODST(3) |
| | TI<6> | ODST(4) |
| | TI<7> | ODST(5) |
| | TI<8> | ODST(6) |
| | TI<9> | ODST(7) |
| | TI<10> | ODST(8) |
| | TI<11> | ODST(9) |
| | TI<12> | ODST(10) |
| R3<br>(4 ≤ INPUT ≤ 8) | TI<13> | ODST(11) |
| | TI<14> | |
| | TI<15> | ODST(12) |
| | TI<16> | |

FIG.26

| INPUT RANGE | AF_SEL='0' | | AF_SEL='1' | |
|---|---|---|---|---|
| R1 | TI<1> | ODST(1) | TI<1> | ODST(1) |
| | TI<2> | | TI<2> | ODST(2) |
| | TI<3> | | TI<3> | ODST(3) |
| | TI<4> | | TI<4> | ODST(4) |
| R2 | TI<5> | ODST(2) | TI<5> | ODST(5) |
| | TI<6> | ODST(3) | TI<6> | |
| | TI<7> | ODST(4) | TI<7> | ODST(6) |
| | TI<8> | ODST(5) | TI<8> | |

ARITHMETIC DEVICES FOR NEURAL NETWORK

CROSS-REFERENCE TO RELATED APPLICATIONS

This application is a continuation-in-part of U.S. patent application Ser. No. 16/932,400, filed on Jul. 17, 2020, which is a continuation-in-part of U.S. patent application Ser. No. 16/919,786, filed on Jul. 2, 2020, which claims priority under 35 U.S.C 119(a) to Korean Application No. 10-2019-0138114, filed on Oct. 31, 2019, Provisional Patent Application No. 62/958,614, filed on Jan. 8, 2020, Provisional Patent Application No. 62/958,609, filed on Jan. 8, 2020, Provisional Patent Application No. 62/959,574, filed on Jan. 10, 2020, and Provisional Patent Application No. 62/959,593, filed on Jan. 10, 2020, which is incorporated herein by reference in its entirety. The U.S. patent application Ser. No. 16/932,400, filed on Jul. 17, 2020 also claims priority under 35 U.S.C 119(a) to Korean Application No. 10-2019-0160238, filed on Dec. 4, 2019, which is incorporated herein by reference in its entirety.

BACKGROUND

1. Technical Field

Embodiments of the present disclosure generally relate to arithmetic devices for a neural network.

2. Related Art

In a neural network, neurons that are mathematically modelled to resemble to a human brain are connected to each other to form a network. Recently, neural network technologies have been developed rapidly. Accordingly, a lot of effort has been focused on analyzing input data and extracting useful information by using neural network technologies in various electronic devices.

SUMMARY

According to an embodiment, an arithmetic device includes a multiplying-accumulating (MAC) operator and an activation function (AF) circuit. The MAC operator is configured to perform a MAC arithmetic operation for weight data and vector data to generate an arithmetic result signal. The AF circuit is configured to store a look-up table for an activation function, configured to adjust a number of logic level combinations of an input distribution signal that correspond to each logic level combination of the output distribution signal, among a plurality of logic level combinations of the output distribution signal, based on an input range of the activation function. In addition, the AF circuit is configured to select and output the output distribution signal that corresponds to the input distribution signal based on the look-up table. The input range of the activation function is based on a relative number of errors that occur.

According to another embodiment, an arithmetic device includes a table input signal generator and an output distribution signal selector. The table input signal generator is configured to generate a table input signal based on an input distribution signal extracted from an arithmetic result signal generated by a multiplying-accumulating (MAC) arithmetic operation. The output distribution signal selector is configured to select and output one of a plurality of logic level combinations of the output distribution signal based on the table input signal and a look-up table for an activation function. The look-up table is applied to adjust a number of bits of the table input signal that correspond to each of logic level combinations of the output distribution signal, among a plurality of logic level combinations of the output distribution signal, based on an input range of the activation function. The input range of the activation function is based on a relative number of errors that occur.

According to yet another embodiment, an arithmetic device includes a multiplying-accumulating (MAC) operator and an activation function (AF) circuit. The MAC operator is configured to perform a MAC arithmetic operation for weight data and vector data to generate an arithmetic result signal. The AF circuit is configured to store a look-up table for an activation function and configured to adjust the number of logic level combinations of an input distribution signal that correspond to each logic level combinations of the output distribution signal, among a plurality of logic level combinations of the output distribution signal, based on an activation function selection signal and an input range of the activation function. In addition, the AF circuit is configured to select and output the output distribution signal corresponding to the input distribution signal based on the look-up table. The input range of the activation function is based on a relative number of errors that occur.

According to another embodiment, an arithmetic device includes a table input signal generator and an output distribution signal selector. The table input signal generator is configured to receive an input distribution signal and output a corresponding signal. The output distribution signal selector is configured to select and output one of a plurality of logic level combinations of the output distribution signal based on the corresponding signal and a look-up table for an activation function. The look-up table is applied to adjust a number of bits of the corresponding signal that correspond to each logic level combination of the output distribution signal, among a plurality of logic level combinations of the output distribution signal, based on an input range of the activation function. The input range of the activation function is based on a relative number of errors that occur.

BRIEF DESCRIPTION OF THE DRAWINGS

FIG. 14 is a table, illustrating an operation of the output distribution signal generation circuit, shown in FIG. 13.

FIGS. 19 and 20 are tables illustrating an operation of the AF circuit illustrated in FIG. 18.

FIG. 22 is a table illustrating an example of a look-up table to which the activation function illustrated in FIG. 21 is applied.

FIG. 26 is a table illustrating an operation of an output distribution signal selector included in the AF circuit illustrated in FIG. 25.

DETAILED DESCRIPTION

In the following description of the embodiments, when a parameter is referred to as being "predetermined", it may be intended to mean that a value of the parameter is determined in advance when the parameter is used in a process or an algorithm. The value of the parameter may be set when the process or the algorithm starts or may be set during a period that the process or the algorithm is executed.

It will be understood that although the terms "first", "second", "third" etc. are used herein to describe various elements, these elements should not be limited by these terms. These terms are only used to distinguish one element from another element. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal with a logic "high" level may be distinguished from a signal with a logic "low" level. For example, when a signal with a first voltage correspond to a signal with a logic "high" level, a signal with a second voltage correspond to a signal with a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal with a logic "high" level in one embodiment may be set to have a logic "low" level in another embodiment.

Various embodiments of the present disclosure will be described hereinafter with reference to the accompanying drawings. However, the embodiments described herein are for illustrative purposes only and are not intended to limit the scope of the present disclosure.

Figure 1:
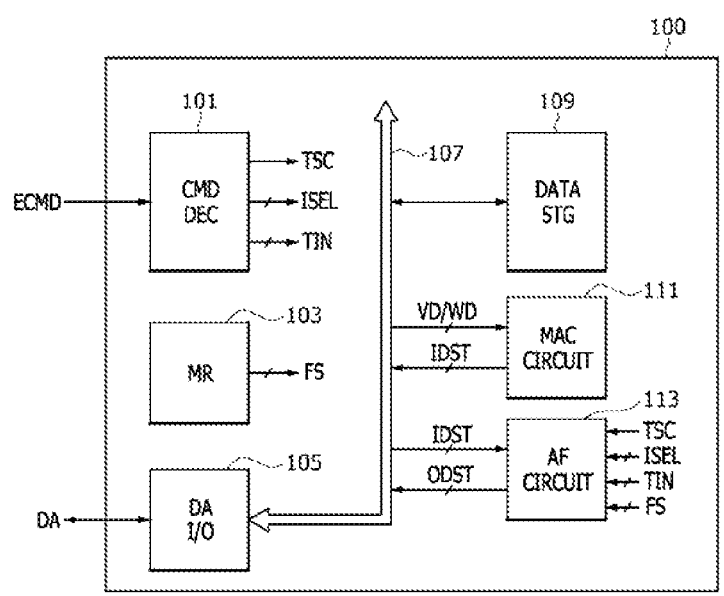
FIG. 1 is a block diagram, illustrating a configuration of an arithmetic device, according to an embodiment of the present disclosure.

As illustrated in FIG. 1, an arithmetic device 13 may include command decoder 101, a mode register 103, a data input/output (I/O) circuit 105, a data line 107, a data storage circuit 109, a MAC circuit 111 and an AF circuit 113.

The command decoder 101 may generate a table set signal TSC, an input selection signal ISEL, and a table input signal TIN based on an external command ECMD. The number of bits included in the input selection signal ISEL may be set to be different according to the embodiments. The number of bits included in the table input signal TIN may be set to be different according to the embodiments.

The command decoder 101 may decode external command ECMD to generate the table set signal TSC. The table set signal TSC may be activated to store an activation function used for a neural network into a first table storage circuit (133 of FIG. 3) in a look-up table form. The number of bits included in the external command ECMD for activating the table set signal TSC may be set to be different according to the embodiments. In addition, a logic level combination of the external command ECMD for activating the table set signal TSC may be set to be different according to the embodiments. The lookup table has a table form that contains information about an input value and the output value corresponding to the input value. When by using the lookup table, the output value corresponding to the input value can be printed directly without any arithmetic, thus improving the arithmetic speed.

The command decoder 101 may decode the external command ECMD to generate the input selection signal ISEL and the table input signal TIN. The input selection signal ISEL and the table input signal TIN may be generated to store the activation function into first to $N^{th}$ variable latches (149_1~149_N of FIG. 4) included in the first table storage circuit (133 of FIG. 3) in a look-up table form. The table input signal TIN may be stored in one variable latch selected by the input selection signal ISEL among the first to $N^{th}$ variable latches (149_1~149_N of FIG. 4). A logic level combination of the external command ECMD for setting logic level combinations of the table input signal TIN may be set to be different based on the embodiments. A logic level combination of the external command ECMD for setting logic level combinations of the input selection signal ISEL may be set to be different based on the embodiments.

The mode register 103 may store a function selection signal FS through a mode register set. The mode register 103 may output the function selection signal FS through a mode register read.

The mode register set and the mode register read are common operations for the mode register 139, so the specific description is omitted. The mode register 103 may apply the function selection signal FS to the AF circuit 113. The function selection signal FS may be generated to select one of various activation functions which are used for a neural network. The various activation functions used for a neural network may include, but are not limited to, sigmoid (i.e., sigmoid function), Tanh (i.e., hyperbolic tangent activation function), ReLU (i.e., rectified linear unit function), leaky ReLU (i.e., leaky rectified linear unit function), Maxout (i.e., max out activation function), and an activation function which is input based on the external command ECMD. The number of bits included in the function selection signal FS may be set to be different according to the embodiments. The mode register 103 can be located on the external side of the arithmetic device 13, for example, on a host or a memory controller.

The data input/output circuit 105 may receive external data DA from the external side of the arithmetic device 13, and transmit the external data DA to at least one of the data storage circuit 109 and the MAC circuit 111 through the data line 107. The data input/output circuit 105 may output data from at least one of the data storage circuit 109, the MAC circuit 111 and the AF circuit 113 through the data line 107 to the external data DA.

The data storage circuit 109 may be stored internally by receiving the external data DA received from the data input/output circuit 105 through the data line 107 in a write operation. The data storage circuit 109 may transmit the data stored internally to the data input/output circuit 105 through the data line 107 and output it to the external data DA in read operation.

The MAC circuit 111 may receive vector data VD and weight data WD. The MAC circuit 111 may receive the vector data VD from the data input/output circuit 105 or data storage circuit 109. The MAC circuit 111 may receive the weight data WD from the data input/output circuit 105 or data storage circuit 109. The MAC circuit 111 may perform MAC arithmetic operation on the vector data VD and the weight data WD, and generate an input distribution signal IDST based on the results of MAC arithmetic operation.

The MAC arithmetic operation may include a multiplying operation and an accumulating operation for the vector data VD and the weight data WD. When the vector data VD and the weight data WD are implemented in matrix format, the MAC arithmetic operations may include multiple multiplying operations and multiple accumulating operations for elements contained in matrix with the vector data VD implemented and elements contained in matrix with the weight data WD implemented. In the neural network, the MAC arithmetic operations are performed to classify features contained in an input layer into resulting values contained in an output layer. The vector data VD may contain information about features contained in the Input layer. The weight data WD may contain information about the influence on classifying features of the input layers as results contained in the output layers. The MAC circuit 111 may receive an output distribution signal ODST from the AF circuit 113 as the vector data VD when multiple layers are applied in perceptron.

The AF circuit 113 may store the activation functions used for a neural network into the first table storage circuit (133 of FIG. 3) in a look-up table form, based on the table set signal TSC, the input selection signal ISEL, and the table input signal TIN. The lookup table stored in the AF circuit 113 includes information regarding the relationship between the input distribution signal IDST and the output distribution signal ODST. The output distribution signal ODST can be defined as the value derived when the input distribution signal IDST is applied to an activation function. The AF circuit 113 may store the table input signal TIN into one variable latch selected by the input selection signal ISEL among the first to $N^{th}$ variable latches (149_1~149_N of FIG. 4) when the table set signal TSC is activated. Various activation functions used for a neural network, for example, sigmoid, Tanh, ReLU, leaky ReLU, and Maxout may be hardwired into the AF circuit 113. The number of the activation functions hardwired in the AF circuit 113 may be set to be different according to the embodiments.

The AF circuit 113 may select one of the various activation functions based on the function selection signal FS. The AF circuit 113 may generate a result value provided by an activation function selected by the function selection signal FS based on the input distribution signal IDST. The AF circuit 113 may extract a result value corresponding to the input distribution signal IDST from a look-up table to which an activation function selected by the function selection signal FS is applied, thereby outputting the result value as an output distribution signal ODST. A configuration and an operation of the AF circuit 113 will be described with reference to FIGS. 3 to 7.

Figure 2:
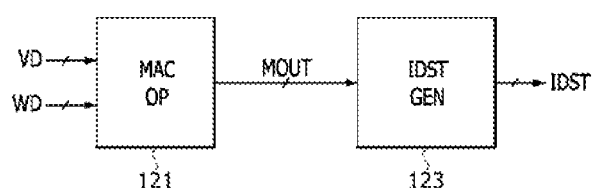
FIG. 2 is a block diagram, illustrating a configuration of a MAC circuit, included in the arithmetic device of FIG. 1.

Referring to FIG. 2, the MAC circuit 111 may include an MAC operator 121 and an input distribution signal generation circuit 123. The MAC operator 121 may receive the vector data VD and the weight data WD and may perform the MAC arithmetic operation including a multiplying operation and an accumulating operation to generate an arithmetic result signal MOUT. The input distribution signal generation circuit 123 may extract only some bits among bits of the arithmetic result signal MOUT to generate the input distribution signal IDST. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 3:
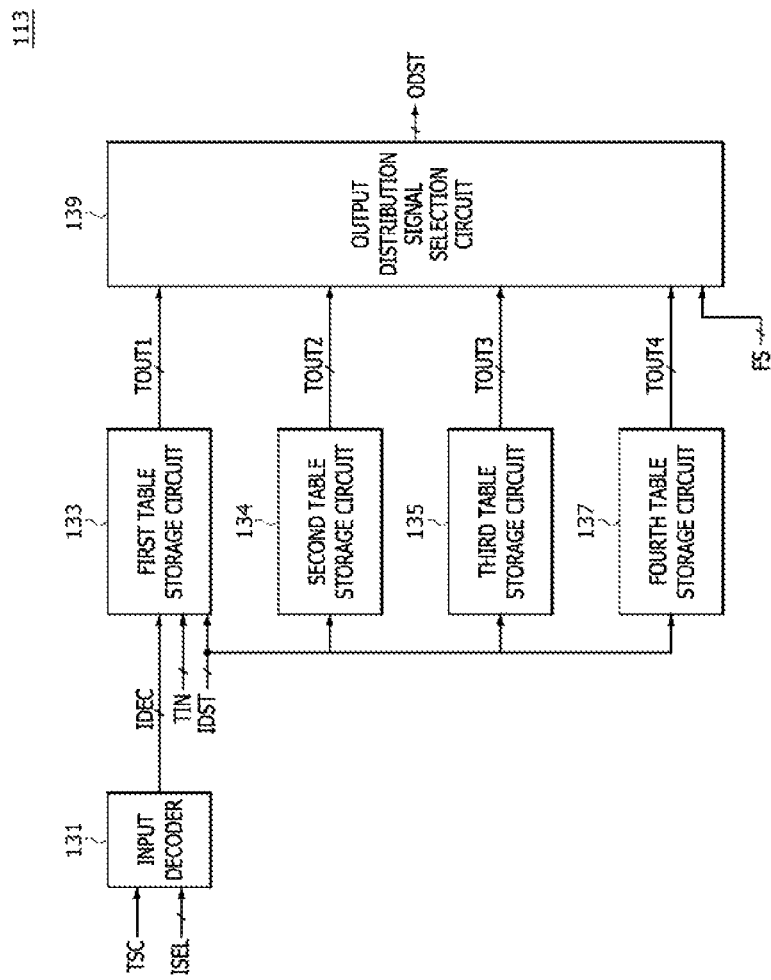
FIG. 3 is a block diagram, illustrating a configuration of an AF circuit, included in the arithmetic device of FIG. 1.

Referring to FIG. 3, the AF circuit 113 may include an input decoder 131, the first table storage circuit 133, a second table storage circuit 134, a third table storage circuit 135, a fourth table storage circuit 137, and an output distribution signal selection circuit 139.

The input decoder 131 may generate a decoded input signal IDEC based on the table set signal TSC and the input selection signal ISEL. The input decoder 131 may decode the input selection signal ISEL to generate the decoded input signal IDEC when the table set signal TSC is activated.

The first table storage circuit 133 may store the table input signal TIN and may output a first table output signal TOUT1, based on the decoded input signal IDEC and the input distribution signal IDST. The first table storage circuit 133 may store the table input signal TIN as a first activation function with a look-up table form based on the decoded input signal IDEC. The first table storage circuit 133 may output a result value of the first activation function as the first table output signal TOUT1 based on the input distribution signal IDST. A configuration and an operation of the first table storage circuit 133 will be described with reference to FIGS. 4 to 6.

A second activation function may be hardwired into the second table storage circuit 134. The second table storage circuit 134 may include logic circuits implemented in hardware with the second activation function. The second activation function may be set as one of sigmoid, Tanh, ReLU, leaky ReLU, and Maxout. The second table storage circuit 134 may output a result value of the second activation function stored in a look-up table form as a second table output signal TOUT2 based on the input distribution signal IDST. A configuration and an operation of the second table storage circuit 134 will be described with reference to FIG. 7.

A third activation function may be hardwired into the third table storage circuit 135. The third table storage circuit 135 may include logic circuits implemented in hardware with the third activation function. The third activation function may be set as one of sigmoid, Tanh, ReLU, leaky ReLU, and Maxout. The third activation function may be set to be different from the second activation function. The third table storage circuit 135 may output a result value of the third activation function stored in a look-up table form as a third table output signal TOUT3 based on the input distribution signal IDST.

A fourth activation function may be hardwired into the fourth table storage circuit 137. The fourth table storage circuit 137 may include logic circuits implemented in hardware with the fourth activation function. The fourth activation function may be set as one of sigmoid, Tanh, ReLU, leaky ReLU, and Maxout. The fourth activation function may be set to be different from the second and third activation functions. The fourth table storage circuit 137 may output a result value of the fourth activation function stored in a look-up table form as a fourth table output signal TOUT4 based on the input distribution signal IDST.

The output distribution signal selection circuit 139 may generate the output distribution signal ODST from the first table output signal TOUT1, the second table output signal TOUT2, the third table output signal TOUT3, and the fourth table output signal TOUT4 based on the function selection signal FS. The output distribution signal selection circuit 139 may output the first table output signal TOUT1 as the output distribution signal ODST when the function selection signal FS has a first logic level combination. The output distribution signal selection circuit 139 may output the second table output signal TOUT2 as the output distribution signal ODST when the function selection signal FS has a second logic level combination. The output distribution signal selection circuit 139 may output the third table output signal TOUT3 as the output distribution signal ODST when the function selection signal FS has a third logic level combination. The output distribution signal selection circuit 139 may output the fourth table output signal TOUT4 as the output distribution signal ODST when the function selection signal FS has a fourth logic level combination.

Figure 4:
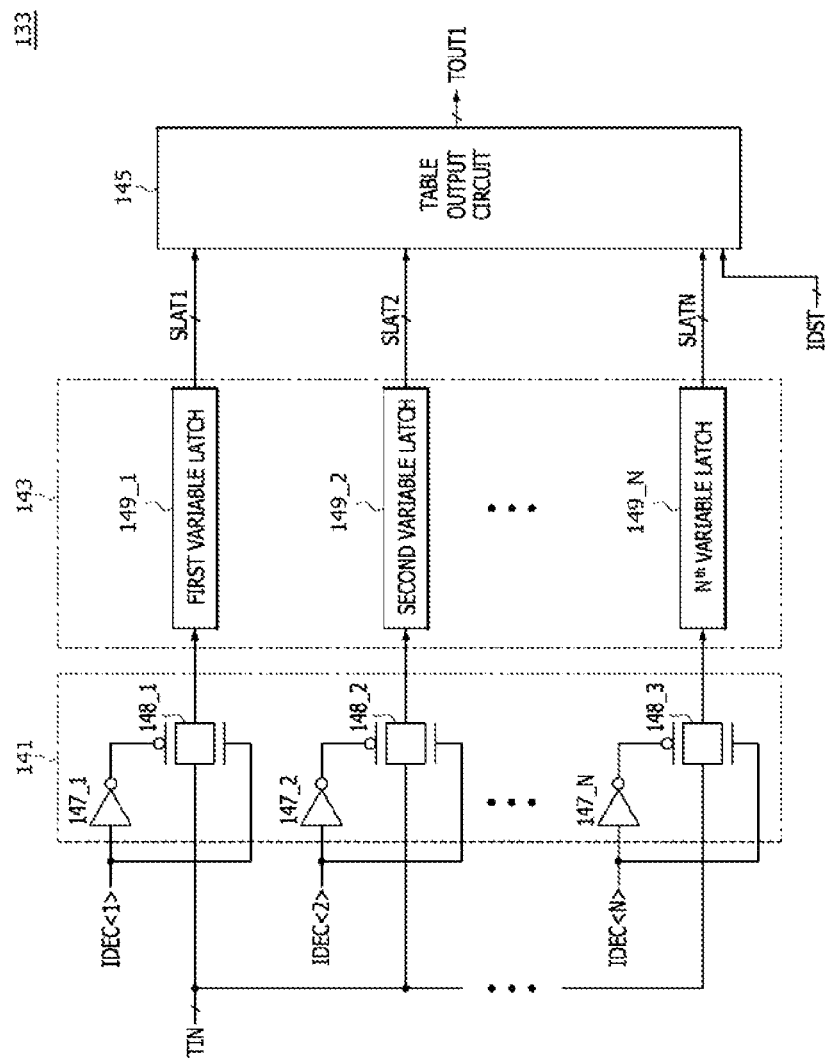
FIG. 4 illustrates a configuration of a first table storage circuit included in the AF circuit of FIG. 3.

Referring to FIG. 4, the first table storage circuit 133 may include a decoded signal input circuit 141, a variable latch circuit 143, and a table output circuit 145.

The decoded signal input circuit 141 may include inverters 147_1~147_N and transfer gates 148_1~148_N. The inverter 147_1 may inversely buffer a first bit signal of the decoded input signal IDEC<1> to output the inversely buffered signal of the first bit signal of the decoded input signal IDEC<1>. The inverter 147_2 may inversely buffer a second bit signal of the decoded input signal IDEC<2> to output the inversely buffered signal of the second bit signal of the decoded input signal IDEC<2>. The inverter 147_N may inversely buffer an $N^{th}$ bit signal of the decoded input signal IDEC<N> to output the inversely buffered signal of the $N^{th}$ bit signal of the decoded input signal IDEC<N>. The transfer gate 148_1 may be turned on to transfer the table input signal TIN to a first variable latch 149_1 when the first bit signal of the decoded input signal IDEC<1> has a logic "high" level. The transfer gate 148_2 may be turned on to transfer the table input signal TIN to a second variable latch 149_2 when the second bit signal of the decoded input signal IDEC<2> has a logic "high" level. The transfer gate 148_N may be turned on to transfer the table input signal TIN to an $N^{th}$ variable latch 149_N when the $N^{th}$ bit signal of the decoded input signal IDEC<N> has a logic "high" level.

The decoded signal input circuit 141 may transfer the table input signal TIN to the first to $N^{th}$ variable latches 149_1~149_N included in the variable latch circuit 143 based on the decoded input signal IDEC. The decoded signal input circuit 141 may receive the table input signal TIN through a path selected by the decoded input signal IDEC to transfer the table input signal TIN to the first to $N^{th}$ variable latches 149_1~149_N included in the variable latch circuit 143.

The variable latch circuit 143 may include the first to $N^{th}$ variable latches 149_1~149_N. The first variable latch 149_1 may receive and store the table input signal TIN through the transfer gate 148_1 turned on when the first bit signal IDEC<1> of the decoded input signal IDEC has a logic "high" level and may output the stored table input signal TIN as a first variable latch signal SLAT1. The second variable latch 149_2 may receive and store the table input signal TIN through the transfer gate 148_2 turned on when the second bit signal IDEC<2> of the decoded input signal IDEC has a logic "high" level and may output the stored table input signal TIN as a second variable latch signal SLAT2. The $N^{th}$ variable latch 149_N may receive and store the table input signal TIN through the transfer gate 148_N turned on when the $N^{th}$ bit signal IDEC<N> of the decoded input signal IDEC has a logic "high" level and may output the stored table input signal TIN as an $N^{th}$ variable latch signal SLATN.

The table output circuit 145 may select one of the first to $N^{th}$ variable latch signals SLAT1~SLATN as a result value of the activation function based on the input distribution signal IDST, thereby outputting the selected variable latch signal as the first table output signal TOUT1. The table output circuit 145 may be realized to select one of the first to $N^{th}$ variable latch signals SLAT1~SLATN as the first table output signal TOUT1 based on a logic level combination of the input distribution signal IDST or based on a decoded signal of the input distribution signal IDST. A configuration and an operation of the table output circuit 145 will be described with reference to FIGS. 5 and 6.

Figure 5:
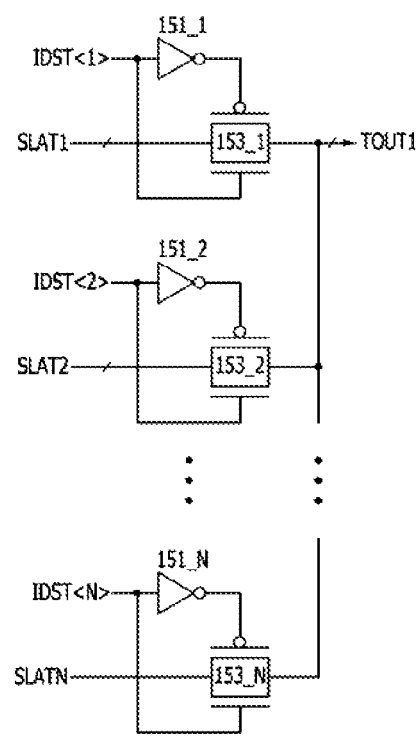
FIGS. 5 and 6 are circuit diagrams, illustrating examples of a table output circuit, included in the first table storage circuit of FIG. 4.

Referring to FIG. 5, a table output circuit 145a corresponding to an example of the table output circuit 145 may include inverters 151_1, 151_2, . . . , and 151_N and transfer gates 153_1, 153_2, . . . , and 153_N. The inverter 151_1 may inversely buffer a first bit signal of the input distribution signal IDST<1> to output the inversely buffered signal of the first bit signal of the input distribution signal IDST<1>. The inverter 151_2 may inversely buffer a second bit signal of the input distribution signal IDST<2> to output the inversely buffered signal of the second bit signal of the input distribution signal IDST<2>. The inverter 151_N may inversely buffer an $N^{th}$ bit signal of the input distribution signal IDST<N> to output the inversely buffered signal of the $N^{th}$ bit signal of the input distribution signal IDST<N>. The transfer gate 153_1 may be turned on to output the first variable latch signal SLAT1 as the first table output signal TOUT1 when the first bit signal of the input distribution signal IDST<1> has a logic "high" level. The transfer gate 153_2 may be turned on to output the second variable latch signal SLAT2 as the first table output signal TOUT1 when the second bit signal of the input distribution signal IDST<2> has a logic "high" level. The transfer gate 153_N may be turned on to output the $N^{th}$ variable latch signal SLATN as the first table output signal TOUT1 when the $N^{th}$ bit signal of the input distribution signal IDST<N> has a logic "high" level.

Figure 6:
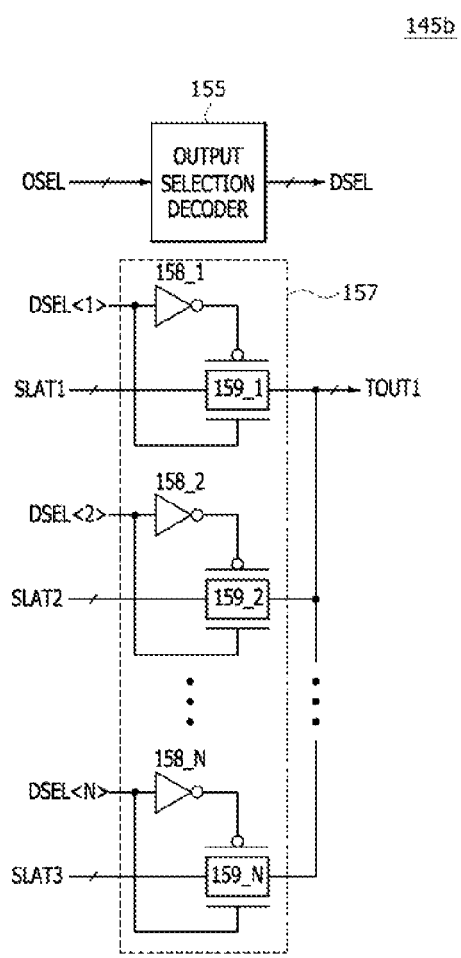

Referring to FIG. 6, a table output circuit 145b corresponding to another example of the table output circuit 145 may include an output selection decoder 155 and a decoded signal output circuit 157. The output selection decoder 155 may decode the input distribution signal IDST to generate a decoded selection signal DSEL. The decoded signal output circuit 157 may include inverters 158_1, 158_2, . . . , and 158_N and transfer gates 159_1, 159_2, . . . , and 159_N. The inverter 158_1 may inversely buffer a first bit signal of the decoded selection signal DSEL<1> to output the inversely buffered signal of the first bit signal of the decoded selection signal DSEL<1>. The inverter 158_2 may inversely buffer a second bit signal of the decoded selection signal DSEL<2> to output the inversely buffered signal of the second bit signal of the decoded selection signal DSEL<2>. The inverter 158_N may inversely buffer an $N^{th}$ bit signal of the decoded selection signal DSEL<N> to output the inversely buffered signal of the $N^{th}$ bit signal of the decoded selection signal DSEL<N>. The transfer gate 159_1 may be turned on to output the first variable latch signal SLAT1 as the first table output signal TOUT1 when the first bit signal of the decoded selection signal DSEL<1> has a logic "high" level. The transfer gate 159_2 may be turned on to output the second variable latch signal SLAT2 as the first table output signal TOUT1 when the second bit signal of the decoded selection signal DSEL<2> has a logic "high" level. The transfer gate 159_N may be turned on to output the $N^{th}$ variable latch signal SLATN as the first table output signal TOUT1 when the $N^{th}$ bit signal of the decoded selection signal DSEL<N> has a logic "high" level.

Figure 7:
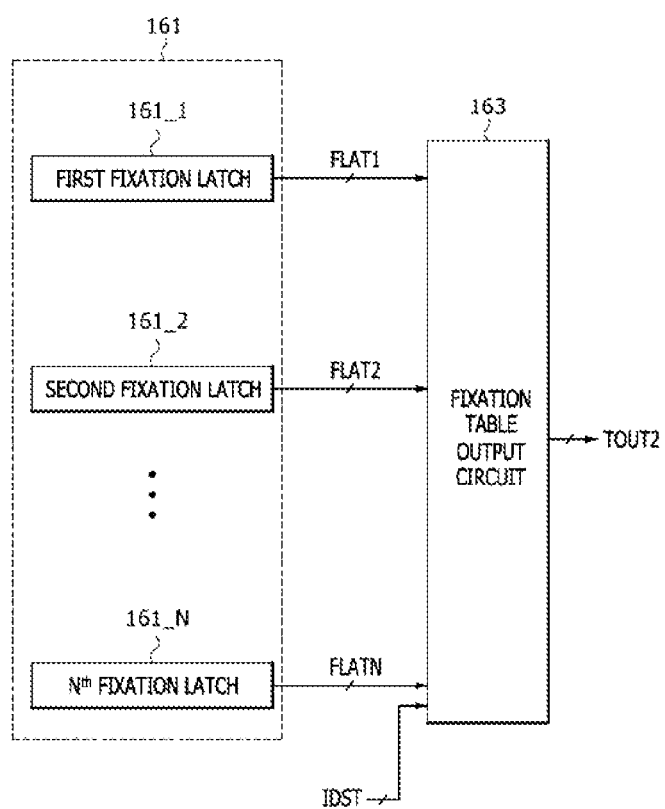
FIG. 7 is a block diagram, illustrating a configuration of a second table storage circuit, included in the AF circuit of FIG. 3.

Referring to FIG. 7, the second table storage circuit 134 may include a fixation latch circuit 161 and a fixation table output circuit 163. The fixation latch circuit 161 may include first to $N^{th}$ fixation latches 161_1~161_N. A first fixation latch signal FLAT1 may be hardwired in the first fixation latch 161_1 as a hardware. A second fixation latch signal FLAT2 may be hardwired in the second fixation latch 161_2 as a hardware. An $N^{th}$ fixation latch signal FLATN may be hardwired in the $N^{th}$ fixation latch 161_N as a hardware. Each of the first to $N^{th}$ fixation latch signals FLAT1~FLATN stored in the first to $N^{th}$ fixation latches 161_1~161_N may be a result value for storing one of sigmoid, Tanh, ReLU, leaky ReLU, and Maxout in a look-up table form. Logic level combinations of the input distribution signal IDST may be set to correspond to the first to $N^{th}$ fixation latch signals FLAT1~FLATN, respectively. The fixation table output circuit 163 may select one of the first to $N^{th}$ fixation latch signals FLAT1~FLATN as a result value of the activation function based on the input distribution signal IDST, thereby outputting the selected variable latch signal as the second table output signal TOUT2. Each of the third and fourth table storage circuits 25 and 26 illustrated in FIG. 3 may be realized to have the same configuration as the second table storage circuit 134 illustrated in FIG. 7.

The arithmetic device 100 with an aforementioned configuration may receive information regarding the activation function used for a neural network as a command and an address to store the information in a look-up table form. Thus, various activation functions set to be different from each other may be applied to the neural network without any design changes.

Figure 8:
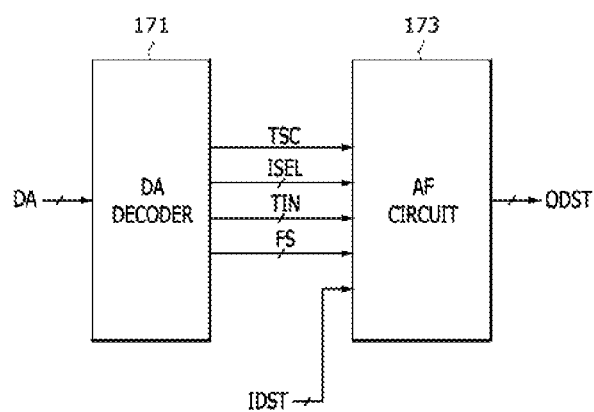
FIG. 8 is a block diagram, illustrating a configuration of an arithmetic device, according to another embodiment of the present disclosure.

Referring to FIG. 8, an arithmetic device 100a according to another embodiment may include an external data decoder 171 and an AF circuit 173.

The external data decoder 171 may receive external data DA to set and output a table set signal TSC, an input selection signal ISEL, a table input signal TIN, and a function selection signal FS. The external data decoder 171 may generate the table set signal TSC, the input selection signal ISEL, the table input signal TIN, and the function selection signal FS from the external data DA which are sequentially input to the external data decoder 171.

The AF circuit 173 may store activation functions used for a neural network in a look-up table form, based on the table set signal TSC, the input selection signal ISEL, and the table input signal TIN. Various activation functions may be hardwired in the AF circuit 173. The AF circuit 173 may output a result value of an activation function, which is selected by the function selection signal FS based on an input distribution signal IDST, as an output distribution signal ODST. A configuration and an operation of the AF circuit 173 may be the same as a configuration and an operation of the AF circuit 113 illustrated in FIG. 1. Thus, descriptions of the AF circuit 173 will be omitted hereinafter.

The arithmetic device 100a with the aforementioned configurations may receive information regarding the activation function used for a neural network as data to store the information in a look-up table form. Thus, various activation functions set to be different from each other may be applied to the neural network without any design changes.

Figure 9:
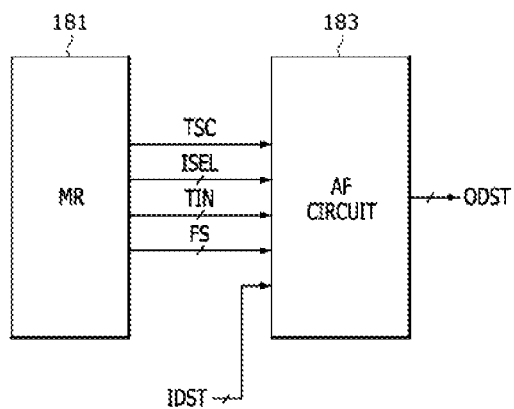
FIG. 9 is a block diagram, illustrating a configuration of an arithmetic device, according to still another embodiment of the present disclosure.

Referring to FIG. 9, an arithmetic device 100b according to still another embodiment may include a mode register 181 and an AF circuit 183.

The mode register 181 may store a table set signal TSC, an input selection signal ISEL, a table input signal TIN, and a function selection signal FS through a mode register set. The mode register 181 may output the table set signal TSC, the input selection signal ISEL, the table input signal TIN, and the function selection signal FS through a mode register read.

The AF circuit 183 may store activation functions used for a neural network in a look-up table form, based on the table set signal TSC, the input selection signal ISEL, and the table input signal TIN. Various activation functions may be hardwired in the AF circuit 183. The AF circuit 183 may output a result value of an activation function, which is selected by the function selection signal FS based on an input distribution signal IDST, as an output distribution signal ODST. A configuration and an operation of the AF circuit 183 may be the same as a configuration and an operation of the AF circuit 113 illustrated in FIG. 1. Thus, descriptions of the AF circuit 183 will be omitted hereinafter.

The arithmetic device 100b with the aforementioned configurations may store information regarding the activation function used for a neural network in a look-up table form based on information stored in the mode register 181.

Thus, various activation functions set to be different from each other may be applied to the neural network without any design changes.

The arithmetic device 100 illustrated in FIG. 1, the arithmetic device 100a illustrated in FIG. 8, and the arithmetic device 100b illustrated in FIG. 9 can be included in memory modules that receive the external command through hosts and memory controllers. Memory modules can be implemented as single in-line memory module (SIMM), dual inline memory module (DIMM), and high bandwidth memory (HBM).

Figure 10:
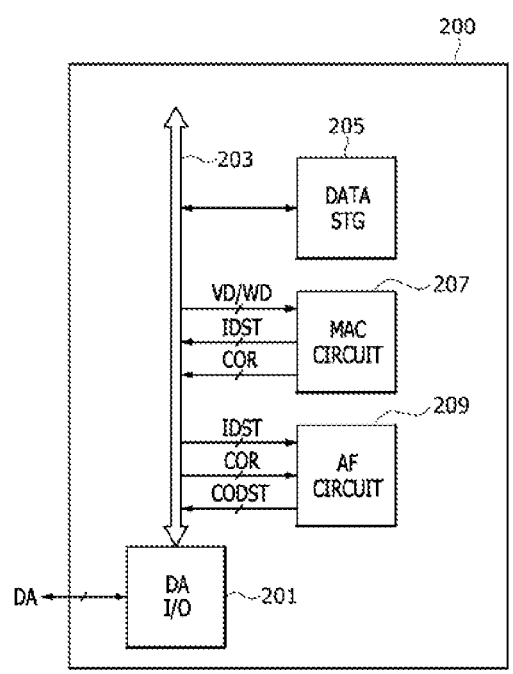
FIG. 10 is a block diagram, illustrating a configuration of an arithmetic device, according to still another embodiment of the present disclosure.

As illustrated in FIG. 10, an arithmetic device 200 may include a data input/output circuit 201, a data line 203, a data storage circuit 205, a MAC circuit 207 and an AF circuit 209.

The data input/output circuit 201 may receive external data DA from the external side of the arithmetic device 13, and transmit the external data DA to at least one of the data storage circuit 205 and the MAC circuit 207 through the data line 203. The data input/output circuit 201 may output data from at least one of the data storage circuit 205, the MAC circuit 207 and the AF circuit 209 through the data line 203 to the external data DA.

The data storage circuit 205 may be stored internally by receiving the external data DA received from the data input/output circuit 201 through the data line 203 in a write operation. The data storage circuit 205 may transmit the data stored internally to the data input/output circuit 201 through the data line 203 and output it to the external data DA in a read operation.

The MAC circuit 207 may receive vector data VD and weight data WD. The MAC circuit 207 may receive the vector data VD from the data input/output circuit 201 or data storage circuit 205.

The MAC circuit 207 may receive the weight data WD from the data input/output circuit 201 or data storage circuit 205. The MAC circuit 207 may perform MAC arithmetic operation on the vector data VD and the weight data WD, and generate an input distribution signal IDST and a compensation signal COR based on the results of MAC arithmetic operation. The MAC circuit 207 may receive a compensated distribution signal CODST from the AF circuit 209 as the vector data VD when multiple layers are applied in perceptron.

The AF circuit 209 may store the activation functions used for a neural network in a look-up table form. The lookup table stored in the AF circuit 209 includes information regarding the relationship between the input distribution signal IDST and the output distribution signal ODST. The output distribution signal ODST can be defined as the value derived when the input distribution signal IDST is applied to an activation function. Various activation functions used for a neural network, for example, sigmoid, Tanh, ReLU, leaky ReLU, and Maxout may be hardwired into the AF circuit 209. The number of the activation functions hardwired in the AF circuit 209 may be set to be different according to the embodiments.

The AF circuit 209 may generate the compensated distribution signal CODST based on the input distribution signal IDST and the compensation signal COR. The AF circuit 209 may generate a first output distribution signal ODST1 and a second output distribution signal ODST2 based on the input distribution signal IDST by using the internally stored activation function. The AF circuit 209 may generate the compensated distribution signal CODST by compensating the first output distribution signal ODST1 based on the compensation signal COR, the first output distribution signal ODST1 and the second output distribution signal ODST2.

Figure 11:
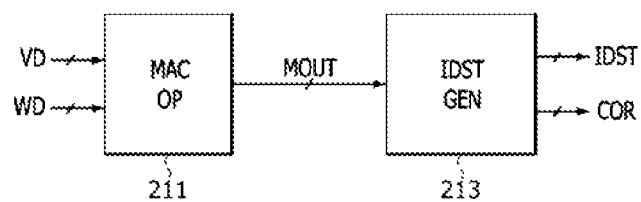
FIG. 11 is a block diagram, illustrating a configuration of a MAC circuit, included in the arithmetic device of FIG. 10.

Referring to FIG. 11, the MAC circuit 207 may include an MAC operator 211 and an input distribution signal generation circuit 213. The MAC operator 211 may receive the vector data VD and the weight data WD and may perform the MAC arithmetic operation including a multiplying operation and an accumulating operation to generate an arithmetic result signal MOUT. The input distribution signal generation circuit 213 may extract only some bits among bits of the arithmetic result signal MOUT to generate the input distribution signal IDST and the compensation signal COR. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT, and the compensation signal COR can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 12:
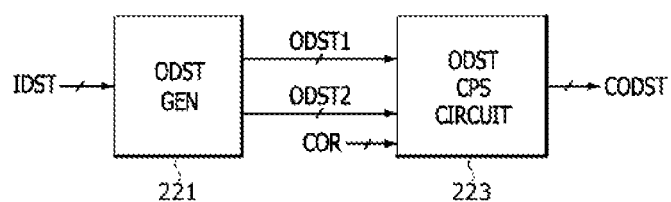
FIG. 12 is a block diagram, illustrating a configuration of an AF circuit, included in the arithmetic device of FIG. 10.

Referring to FIG. 12, the AF circuit 209 may include an output distribution signal generation circuit 221, and an output distribution signal compensation circuit 223.

The output distribution signal generation circuit 221 may generate a first output distribution signal ODST1 and a second output distribution signal ODST2 based on the input distribution signal IDST. The output distribution signal generation circuit 221 may store the activation function in a look-up table. The output distribution signal generation circuit 221 may apply the input distribution signal IDST to the activation function to generate the first output distribution signal ODST1. The output distribution signal generation circuit 221 may apply a value, the value obtained by adding a predetermined value to the input distribution signal IDST, to the activation function to generate the second output distribution signal ODST2.

The output distribution signal compensation circuit 223 may generate a compensated distribution signal CODST based on the first output distribution signal ODST1, the second output distribution signal ODST2, and the compensation signal COR. The output distribution signal compensation circuit 223 may generate the compensated distribution signal CODST by multiplying the value of the compensation signal COR and the value of the difference between the first output distribution signal ODST1 and the second output distribution signal ODST2. Since the output distribution signal compensation circuit 223 compensates for the first output distribution signal ODST1 based on the compensation signal COR to generate the compensated distribution signal CODST, accuracy of the activation function may be improved.

Figure 13:
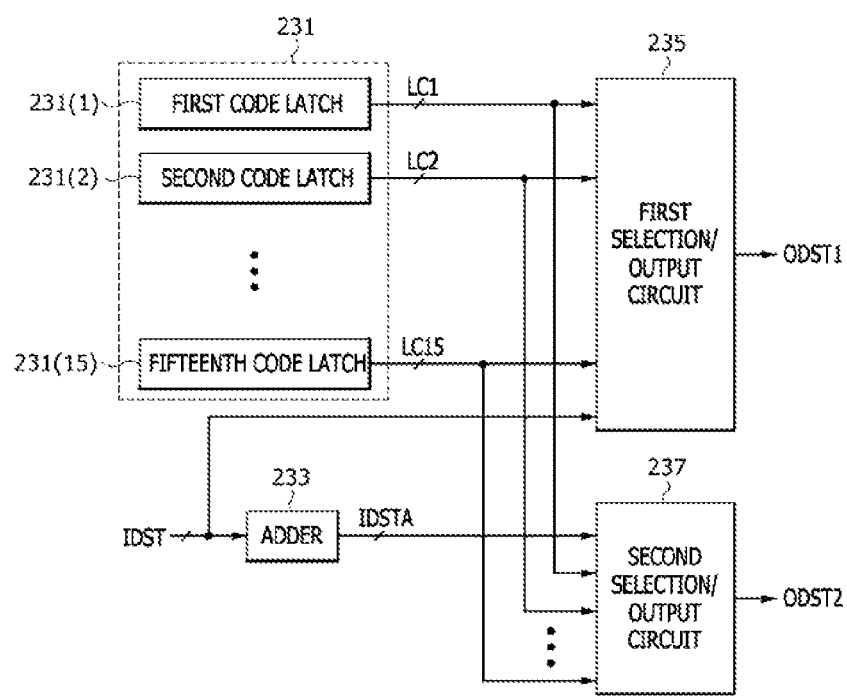
FIG. 13 is a block diagram, illustrating a configuration of an output distribution signal generation circuit, included in the AF circuit of FIG. 12.

As illustrated in FIG. 13, the output distribution signal generation circuit 221 may include a code latch circuit 231, an adder 233, a first selection/output circuit 235, and a second selection/output circuit 237.

The code latch circuit 231 may include a first to fifteenth code latches 231(1:15) and may store the activation function in a look-up table. The first code latch 231(1) may latch and output a first latch code LC1, the second code latch 231(2) may latch and output a second latch code LC2, and so on and so forth.

The adder 233 may add a predetermined value to the input distribution signal IDST to generate an added input distribution signal IDSTA. The adder 233 may add a binary number '1' to the input distribution signal IDST to generate the added input distribution signal IDSTA. For example, when the input distribution signal IDST<4:1> is set as a binary code of '1001', the added input distribution signal IDSTA<4:1> may be generated to have a binary code of '1010'. In some embodiments, the predetermined value added to the input distribution signal IDST may be set as the binary number of '10'.

The first selection/output circuit 235 may select and output one of the first to fifteenth latch codes LC1~LC15 as the first output distribution signal ODST1 based on the input distribution signal IDST. The first selection/output circuit 235 may select and output a code corresponding to a logic level combination of the input distribution signal IDST, among the first to fifteenth latch code LC1~LC15, as the first output distribution signal ODST1 based on the activation function.

The second selection/output circuit 237 may select and output one of the first to fifteenth latch code LC1~LC15 as the second output distribution signal ODST2 based on the added input distribution signal IDSTA. The second selection/output circuit 237 may select and output a code corresponding to a logic level combination of the added input distribution signal IDSTA, among the first to fifteenth latch code LC1~LC15, as the second output distribution signal ODST2 based on the activation function.

Referring to FIG. 14, set values of an output selection signal ODST, selected by logic level combinations of the input distribution signal IDST<4:1>, based on the activation function, are listed in a look-up table. The set value of the output selection signal ODST may be 'Y1' when the logic level combination of the input distribution signal IDST<4:1> has a binary number of '0001' (corresponding to a decimal number of '1'), and the set value of the output selection signal ODST may be 'Y2' when the logic level combination of the input distribution signal IDST<4:1> has a binary number of '0010' (corresponding to a decimal number of '2'). In addition, the set value of the output selection signal ODST may be 'Y9' when the logic level combination of the input distribution signal IDST<4:1> has a binary number of '1001' (corresponding to a decimal number of '9'), and the set value of the output selection signal ODST may be 'Y10' when the logic level combination of the input distribution signal IDST<4:1> has a binary number of '1010' (corresponding to a decimal number of '10'). Moreover, the set value of the output selection signal ODST may be 'Y15' when the logic level combination of the input distribution signal IDST<4:1> has a binary number of '1111' (corresponding to a decimal number of '15'). The value of 'Y1' may be a set value of the first latch code LC1, and the value of 'Y2' may be a set value of the second latch code LC2. In addition, the value of 'Y9' may be a set value of the ninth latch code LC9, and the value of 'Y10' may be a set value of the tenth latch code LC10. Moreover, the value of 'Y15' may be a set value of the fifteenth latch code LC15. When the logic level combination of the input distribution signal IDST<4:1> has a binary number of '1001' (corresponding to a decimal number of '9'), the added input distribution signal IDSTA<4:1>, output from the adder 233, may be set as a binary number of '1010'. In such a case, the first output distribution signal ODST1, output from the first selection/output circuit 235 based on the input distribution signal IDST<4:1>, may be 'Y9', and second output distribution signal ODST2, output from the second selection/output circuit 237 based on the added input distribution signal IDSTA<4:1>, may be 'Y10'. In this embodiment, the input distribution signal IDST contains 4 bits is only an example and is not limited to that. The combination of set values Y1-Y15 set by the output selection signal ODST and latch codes LC1-LC15 can vary depending on the number of bits contained in the input distribution signal IDST.

Figure 15:
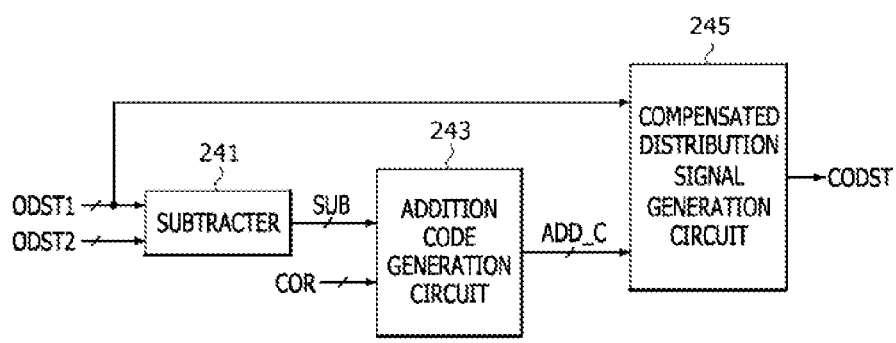
FIG. 15 is a block diagram, illustrating a configuration of an output distribution signal compensation circuit, included in the AF circuit of FIG. 12.

As illustrated in FIG. 15, the output distribution signal compensation circuit 223 may include a subtracter 241, an addition code generation circuit 243, and a compensated distribution signal generation circuit 245.

The subtracter 241 may subtract the first output distribution signal ODST1 from the second output distribution signal ODST2 to generate a subtraction code SUB. The subtraction code SUB may be generated to have a logic level combination corresponding to the difference between the first output distribution signal ODST1 and the second output distribution signal ODST2. For example, when the difference between the first output distribution signal ODST1 and the second output distribution signal ODST2 is a decimal number of '4', the subtraction code SUB may be generated to have a logic level combination corresponding to the binary number of '100'.

The addition code generation circuit 243 may generate an addition code ADD_C based on the subtraction code SUB and the compensation signal COR. The addition code generation circuit 243 may multiply the subtraction code SUB by a compensation value, is the compensation value being set by the compensation signal COR, to generate a subtraction/compensation value. The addition code generation circuit 243 may generate the addition code ADD_C with a logic level combination corresponding to an integer selected by the subtraction/compensation value. The compensation value set by the compensation signal COR may set the total number of logic level combinations of the compensation signal COR as its denominator and may set the value corresponding to a logic level combination of the compensation signal COR as its numerator. The addition code ADD_C may be set to have a logic level combination corresponding to an integer included in the subtraction/compensation value. For example, when the subtraction/compensation value has a value of '1.5', the addition code ADD_C may be set to have a logic level combination of '01', corresponding to an integer of '1'. In some embodiments, the addition code ADD_C may be set to have a logic level combination corresponding to an integer obtained by raising fractions (not lower than 0.5) of the subtraction/compensation value to a unit. For example, when the subtraction/compensation value has a value of '1.5', the addition code ADD_C may be set to have a logic level combination of '10', corresponding to an integer of '2'.

The compensated distribution signal generation circuit 245 may add the addition code ADD_C to the first output distribution signal ODST1 to generate the compensated distribution signal CODST. For example, when the first output distribution signal ODST1 has a logic level combination of '10' and the addition code ADD_C has a value of '1', the compensated distribution signal CODST may be set to have a logic level combination of '11'.

Figure 16:
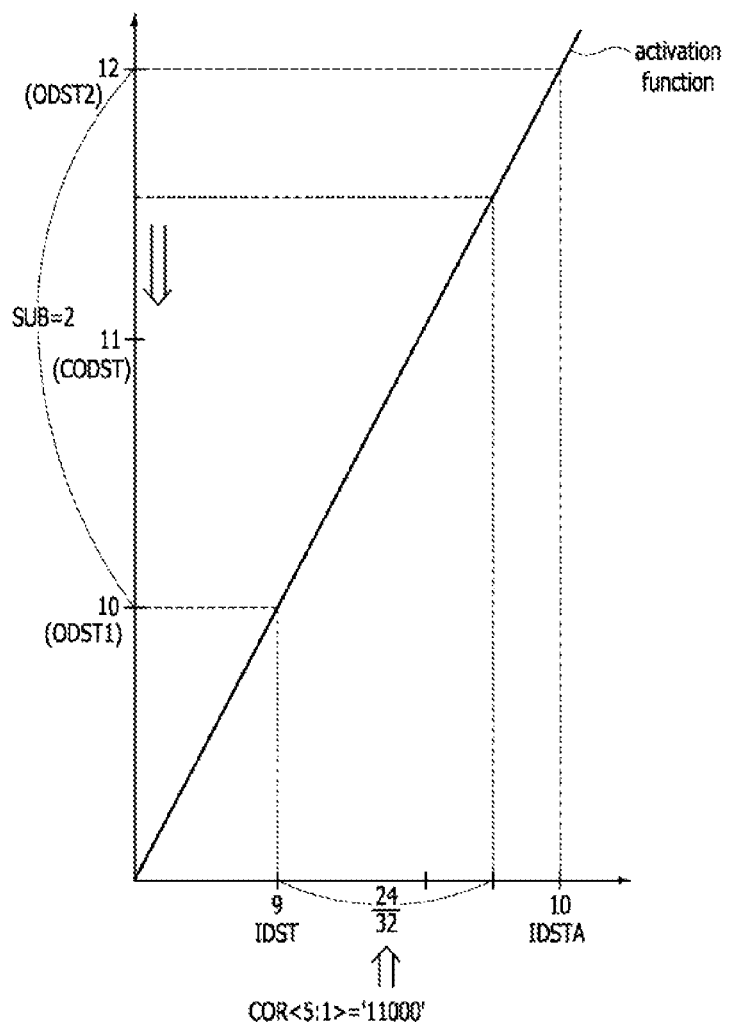
FIG. 16 is a graph, illustrating an operation of the output distribution signal compensation circuit, shown in FIG. 15.

FIG. 16 is a graph illustrating an operation of the output distribution signal compensation circuit 223. In the graph of FIG. 16, the abscissa denotes values of the input distribution signal IDST and the added input distribution signal IDSTA, and the ordinate denotes values of the first output distribution signal ODST1, the second output distribution signal ODST2, and the compensated distribution signal CODST. An operation for generating the compensated distribution signal CODST will be described hereinafter with reference to FIG. 16 in conjunction with a case in which the input distribution signal IDST has a value of '9' and the added input distribution signal IDSTA has a value of '10'.

In the embodiment, the first output distribution signal ODST1 may be generated to have a value of '10' based on the activation function when the input distribution signal IDST has a value of '9', and the second output distribution signal ODST2 may be generated to have a value of '12' based on the activation function when the added input distribution signal IDSTA has a value of '10'. Thus, the subtraction code SUB may be set as '2'. When the compensation signal COR has a value of '11000', the compensation value may be set as '24/32'. Accordingly, because the subtraction code SUB has a value of '2', the subtraction/compensation value may be calculated by a formula "2×24/32=48/32=1+16/32". Because the addition code ADD_C is set as an integer part of the subtraction/compensation value, the addition code ADD_C may have a value of '1'. The compensated distribution signal CODST may be set as a value of '11' corresponding to a value obtained by adding the addition code ADD_C to the first output distribution signal ODST1.

As described above, the arithmetic device 200 may generate the compensated distribution signal CODST by adding the addition code ADD_C, generated based on the compensation signal COR, to the first output distribution signal ODST1, selected and output based on the input distribution signal IDST along the activation function. Thus, the accuracy of the activation function may be improved.

Figure 17:
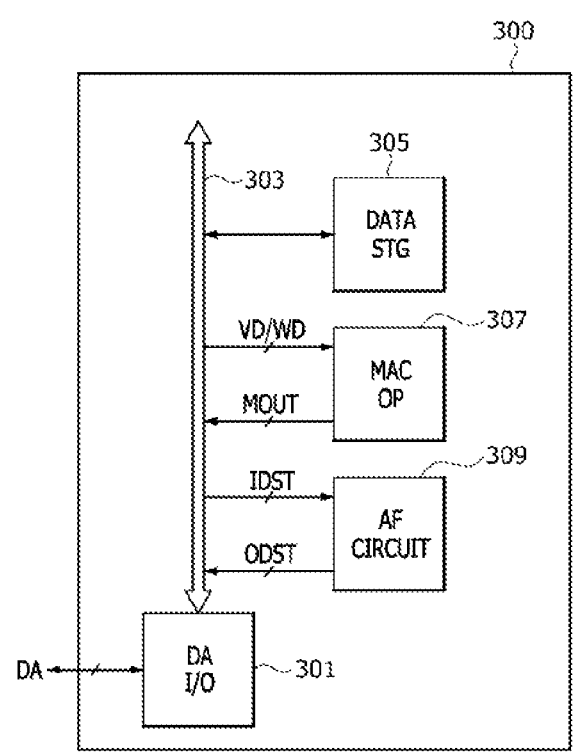
FIG. 17 is a block diagram illustrating a configuration of an arithmetic device for neural networks according to yet another embodiment of the present disclosure.

As illustrated in FIG. 17, an arithmetic device 300, according to yet another embodiment of the present disclosure, may include a data I/O circuit 301, a data line 303, a data storage circuit 305, a MAC operator 307, and an AF circuit 309.

The data I/O circuit 301 may receive external data DA from an external device that is coupled to the arithmetic device 300 and may transmit the external data DA to at least one of the data storage circuit 305 and the MAC operator 307 through the data line 303. The data I/O circuit 301 may output data as the external data DA through the data line 303, the data being transmitted from at least one of the data storage circuit 305, the MAC operator 307, and the AF circuit 309.

The data storage circuit 305 may receive the external data DA, which is output from the data I/O circuit 301 through the data line 303 during a write operation, to store the external data DA therein. The data storage circuit 305 may transmit data, which is stored in the data storage circuit 305, to the data I/O circuit 301 through the data line 303 during a read operation, and the data I/O circuit 301 may output data that is transmitted from the data storage circuit 305 as the external data DA during the read operation.

The MAC operator 307 may receive vector data VD and weight data WD. The MAC operator 307 may receive the vector data VD from the data I/O circuit 301 or the data storage circuit 305. The MAC operator 307 may receive the weight data WD from the data I/O circuit 301 or the data storage circuit 305. The MAC operator 307 may perform a MAC arithmetic operation for the vector data VD and the weight data WD to generate an arithmetic result signal MOUT.

The AF circuit 309 may store an activation function that is used for a neural network in a look-up table form. A look-up table that is stored in the AF circuit 309 may include information regarding the relationship between an input distribution signal IDST and an output distribution signal ODST. The output distribution signal ODST may be defined as a value that is calculated when the input distribution signal IDST is applied to the activation function. The AF circuit 309 may receive the input distribution signal IDST through the data line 303. The input distribution signal IDST may be generated from the arithmetic result signal MOUT, which is output from the MAC operator 307. The input distribution signal IDST may be set to be the same as the arithmetic result signal MOUT or may be extracted from the arithmetic result signal MOUT. For example, some bits may be extracted from bits that are included in the arithmetic result signal MOUT to form the input distribution signal IDST. The number of bits that are included in the input distribution signal IDST may be set to be different according to the embodiments. The number of bits included in the output distribution signal ODST may also be set to be different according to the embodiments. The number of bits included in the arithmetic result signal MOUT may also be set to be different according to the embodiments.

The AF circuit 309 may include the look-up table for the activation function. The AF circuit 309 may adjust the number of logic level combinations of the input distribution signal IDST that correspond to each of the logic level combinations of the output distribution signal ODST based on the errors that occur according to an input range of the activation function. The AF circuit 309 may utilize the look-up table for the activation function in a way that reduces the number of logic level combinations of the input distribution signal IDST that correspond to the logic level combinations of the output distribution signal ODST in an input range with relatively more errors as compared to an input range with relatively less errors, thereby improving an accuracy of the activation function. The AF circuit 309 may utilize a look-up table for the activation function in a way that increases the number of the logic level combinations of the input distribution signal IDST that correspond to the logic level combinations of the output distribution signal ODST in an input range with relatively less errors as compared to an input range with relatively more errors, thereby reducing the storage space that is necessary to configure and utilize the look-up table.

Figure 18:
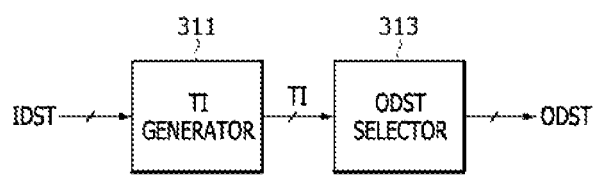
FIG. 18 is a block diagram illustrating a configuration of an example of an AF circuit included in the arithmetic device illustrated in FIG. 17.

As illustrated in FIG. 18, the AF circuit 309 may include a table input signal generator (TI GENERATOR) 311 and an output distribution signal selector (ODST SELECTOR) 313.

The table input signal generator 311 may generate a table input signal TI from the input distribution signal IDST. The table input signal generator 311 may include a decoder that decodes the input distribution signal IDST to generate the table input signal TI. The table input signal generator 311 may selectively activate one of the bits that are included in the table input signal TI based on a logic level combination of the input distribution signal IDST. For example, a first bit TI<1> of the table input signal TI may be activated when the input distribution signal IDST has a first logic level combination, a second bit TI<2> of the table input signal TI may be activated when the input distribution signal IDST has a second logic level combination, and an $L^{th}$ bit TI<L> of the table input signal TI may be activated when the input distribution signal IDST has an $L^{th}$ logic level combination (where, "L" is a natural number).

The output distribution signal selector 313 may receive the table input signal TI from the table input signal generator 311. The output distribution signal selector 313 may generate the output distribution signal ODST based on the table input signal TI. The output distribution signal selector 313 may set a logic level combination of the output distribution signal ODST that corresponds to the table input signal TI based on an input range of the activation function. The input range of the activation function may be based on the relative number of errors that occur. The output distribution signal selector 313 may select and output a logic level combination of the output distribution signal ODST that corresponds to at least two of the bits that are included in the table input signal TI in a first input range of the activation function, in which errors occur relatively less often. For example, in the event that the first input range of the activation function corresponds to first to eighth bits TI<1:8> of the table input signal TI, the output distribution signal selector 313 may select and output a first logic level combination ODST(1) of the output distribution signal ODST when one of the first to fourth bits TI<1:4> of the table input signal TI is activated, and the output distribution signal selector 313 may select and output a second logic level combination ODST(2) of the output distribution signal ODST when one of the fifth to eighth bits TI<5:8> of the table input signal TI is activated. The output distribution signal selector 313 may increase the number of bits that are included in the table input signal TI that corresponds to a logic level combination of the output distribution signal ODST in the first input range as opposed to a second input range, thereby reducing the space required for the look-up table. The output distribution signal selector 313 may select and output a logic level combination of the output distribution signal ODST that corresponds to bits that are included in the table input signal TI in the second input range of the activation function, in which errors occur relatively more often. For example, in the event that the second input range of the activation function corresponds to ninth to tenth bits TI<9:10> of the table input signal TI, the output distribution signal selector 313 may select and output a third logic level combination ODST(3) of the output distribution signal ODST when the ninth bit TI<9> of the table input signal TI is activated, and the output distribution signal selector 313 may select and output a fourth logic level combination ODST(4) of the output distribution signal ODST when the tenth bit TI<10> of the table input signal TI is activated. The output distribution signal selector 313 may reduce the number of bits that are included in the table input signal TI that correspond to a logic level combination of the output distribution signal ODST in the second input range as opposed to the first input range, thereby improving the accuracy of the activation function.

Referring to FIG. 19, bits, which are selected and activated by the table input signal generator 311 based on the logic level combinations of the input distribution signal IDST, among bits that are included in the table input signal TI, are illustrated. The table input signal generator 311 may activate the first bit TI<1> of the table input signal TI to output the activated first bit TI<1> when the input distribution signal IDST with the first logic level combination IDST(1) is input to the table input signal generator 311, may activate the second bit TI<2> of the table input signal TI to output the activated second bit TI<2> when the input distribution signal IDST with the second logic level combination IDST(2) is input to the table input signal generator 311, and may activate the $L^{th}$ bit TI<L> of the table input signal TI to output the activated $L^{th}$ bit TI<L> when the input distribution signal IDST with the $L^{th}$ logic level combination IDST(L) is input to the table input signal generator 311. More specifically, in the event that the input distribution signal IDST includes three bits and the table input signal TI includes eight bits (i.e., the first to eighth bits TI<1:8>), only the first bit TI<1>, among the first to eighth bits TI<1:8> of the table input signal TI, may be activated to have a binary number of '1' when the input distribution signal IDST has a logic level combination of '001'. Similarly, only the second bit TI<2>, among the first to eighth bits TI<1:8> of the table input signal TI, may be activated to have a binary number of '1' when the input distribution signal IDST has a logic level combination of '010'.

Referring to FIG. 20, various logic level combinations of the output distribution signal ODST that correspond to four-bit groups, among a plurality of bits that are included in the table input signal TI, are listed in a first range R1 with relatively less errors. The first to fourth bits TI<1:4> of the table input signal TI may correspond to the first logic level combination ODST(1) of the output distribution signal ODST, the fifth to eighth bits TI<5:8> of the table input signal TI may correspond to the second logic level combination ODST(2) of the output distribution signal ODST, and the $(4M-3)^{th}$ to $4M^{th}$ bits TI<4M-3:4M> of the table input signal TI may correspond to the $M^{th}$ logic level combination ODST(M) of the output distribution signal ODST. Based on the table illustrated in FIG. 20, the output distribution signal selector 313 that is illustrated in FIG. 18 may output the output distribution signal ODST with the $M^{th}$ logic level combination ODST(M) when one among the $(4M-3)^{th}$ to $4M^{th}$ bits TI<4M-3:4M> of the table input signal TI is activated (where, "M" is set as a natural number). In the present embodiment, the number of bits of the table input signal TI that correspond to each logic level combination of the output distribution signal ODST in the first input range R1 may be a natural number that is set to be greater than the number of bits of the table input signal TI that correspond to each logic level combination of the output distribution signal ODST in a second input range R2. For instance, FIG. 20 illustrates four bits of the table input signal TI (for example, TI<1> to TI<4) that correspond to each logic level combination of the output distribution signal ODST (for example, ODST(1)) in the first input range R1 and illustrates one bit of the table input signal TI (for example, TI<4M+1>) that corresponds to a logic level combination of the output distribution signal ODST (for example, ODST(M+1)) in the second input range R2. However, the present disclosure is not limited thereto, and the number of bits that correspond to each logic level combination of the output distribution signal ODST may differ.

Referring again to FIG. 20, various logic level combinations of the output distribution signal ODST that correspond to bits that are included in the table input signal TI are listed in the second range R2 with relatively more errors. The $(4M+1)^{th}$ bit TI<4M+1> of the table input signal TI may correspond to the $(M+1)^{th}$ logic level combination ODST(M+1) of the output distribution signal ODST, the $(4M+2)^{th}$ bit TI<4M+2> of the table input signal TI may correspond to the $(M+2)^{th}$ logic level combination ODST(M+2) of the output distribution signal ODST, and the $(4M+N)^{th}$ bit TI<4M+N> of the table input signal TI may correspond to the $(M+N)^{th}$ logic level combination ODST(M+N) of the output distribution signal ODST. Based on the table illustrated in FIG. 20, the output distribution signal selector 313 that is illustrated in FIG. 18 may output the output distribution signal ODST with the $(M+N)^{th}$ logic level combination ODST(M+N) when the $(4M+N)^{th}$ bit TI<4M+N> of the table input signal TI is activated (where, "N" is set as a natural number). In the present embodiment, the number of bits of the table input signal TI that correspond to each logic level combination of the output distribution signal ODST in the second input range R2 may be a natural number that is less than the number of bits of the table input signal TI that correspond to each logic level combination of the output distribution signal ODST in the first input range R1.

Figure 21:
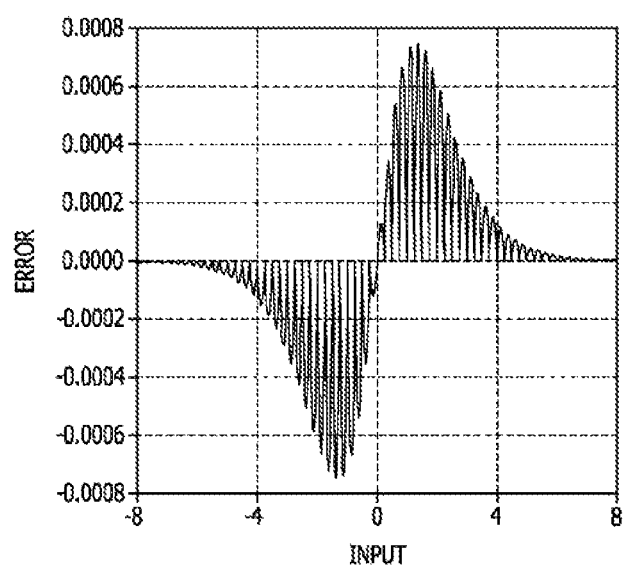
FIG. 21 is a graph of an activation function which is capable of verifying errors that occur according to an input range of the activation function when the activation function is realized in a look-up table form to apply to the AF circuit illustrated in FIG. 18.

Referring to FIG. 21, when the look-up table is realized by using a sigmoid function or a hyperbolic tangent function as the activation function, errors that occur based on an input range of the activation function are listed. For example, in an input range of minus eight (−8) to minus four (−4) and an input range of plus four (+4) to plus eight (+8), the number of errors that occur when the look-up table is applied may be relatively small. In contrast, in an input range of minus four (−4) to plus four (+4), the number of errors that occur when the look-up table is applied may be relatively big.

Referring to FIG. 22, various logic level combinations of the output distribution signal ODST that correspond to bits that are included in the table input signal TI are listed based on an input range of the activation function in a look-up table, corresponding to the errors that are illustrated in FIG. 21. In a first input range R1 of −8 to −4 with relatively less errors, the first and second bits TI<1:2> of the table input signal TI may correspond to a first logic level combination ODST(1) of the output distribution signal ODST, and the third and fourth bits TI<3:4> of the table input signal TI may correspond to a second logic level combination ODST(2) of the output distribution signal ODST. In a second input range R2 of −4 to +4 with relatively more errors, the fifth bit TI<5> of the table input signal TI may correspond to a third logic level combination ODST(3) of the output distribution signal ODST, and the sixth bit TI<6> of the table input signal TI may correspond to a fourth logic level combination ODST (4) of the output distribution signal ODST. Similarly, in the second input range R2, the seventh to twelfth bits TI<7:12> of the table input signal TI may correspond to fifth to tenth logic level combinations ODST(5:10) of the output distribution signal ODST, respectively. In a third input range R3 of 4 to 8 with relatively less errors, the thirteenth and fourteenth bits TI<13:14> of the table input signal TI may correspond to an eleventh logic level combination ODST (11) of the output distribution signal ODST, and the fifteenth and sixteenth bits TI<15:16> of the table input signal TI may correspond to a twelfth logic level combination ODST(12) of the output distribution signal ODST.

Figure 23:
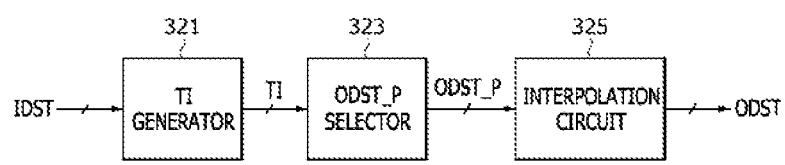
FIG. 23 is a block diagram illustrating a configuration of another example of an AF circuit included in the arithmetic device illustrated in FIG. 17.

As illustrated in FIG. 23, another AF circuit 309A may include a table input signal generator (TI GENERATOR) 321, a pre-output distribution signal selector (ODST_P SELECTOR) 323, and an interpolation circuit 325. The table input signal generator 321 and the pre-output distribution signal selector 323 may be realized to have the same configurations as the table input signal generator 311 and the output distribution signal selector 313 that are illustrated in FIG. 18, respectively. Thus, detailed descriptions of the table input signal generator 321 and the pre-output distribution signal selector 323 will be omitted hereinafter. The interpolation circuit 325 may receive a pre-output distribution signal ODST_P from the pre-output distribution signal selector 323. The interpolation circuit 325 may use a first order approximation function or a second order approximation function and may interpolate the pre-output distribution signal ODST_P to generate the output distribution signal ODST. The AF circuit 309A, illustrated in FIG. 23, may include the interpolation circuit 325 to generate the output distribution signal ODST with reduced errors.

Figure 24:
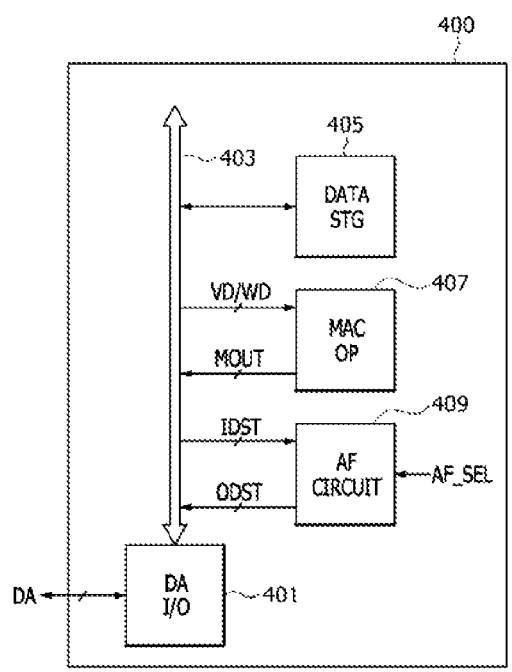
FIG. 24 is a block diagram illustrating a configuration of an arithmetic device for neural networks according to yet still another embodiment of the present disclosure.

As illustrated in FIG. 24, an arithmetic device 400, according to further another embodiment, may include a data I/O circuit 401, a data line 403, a data storage circuit 405, a MAC operator 407, and an AF circuit 409. The data I/O circuit 401, the data line 403, the data storage circuit 405, and the MAC operator 407 may have the same configurations as the data I/O circuit 301, the data line 303, the data storage circuit 305, and the MAC operator 307 illustrated in FIG. 17, respectively. Thus, detailed descriptions of the data I/O circuit 401, the data line 403, the data storage circuit 405, and the MAC operator 407 will be omitted hereinafter.

The AF circuit 409 may store a plurality of activation functions that are used for a neural network in a look-up table form. The AF circuit 409 may select one of the plurality of activation functions that are stored therein based on an activation function selection signal AF_SEL. The AF circuit 409 may include a look-up table for an activation function, adjusting the number of logic level combinations of the input distribution signal IDST that correspond to each of the logic level combinations of the output distribution signal ODST based on an input range of the activation function that is selected by the activation function selection signal AF_SEL. The input range of the activation function may be based on the relative number of errors that occur. The activation function selection signal AF_SEL may be set by a mode register set operation or may be extracted from the arithmetic result signal MOUT that is output from the MAC operator 407.

Figure 25:
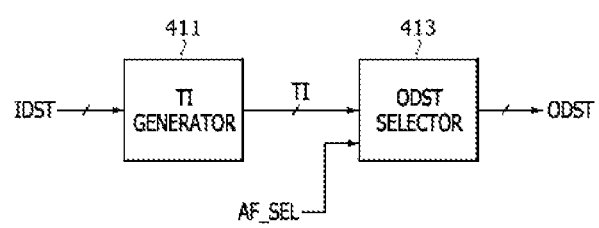
FIG. 25 is a block diagram illustrating a configuration of an example of an AF circuit included in the arithmetic device illustrated in FIG. 24.

As illustrated in FIG. 25, the AF circuit 409 may include a table input signal generator (TI GENERATOR) 411 and an output distribution signal selector (ODST SELECTOR) 413. The table input signal generator 411 may have the same configuration as the table input signal generator 311 that is illustrated in FIG. 18. Thus, detailed descriptions of the table input signal generator 411 will be omitted hereinafter.

The output distribution signal selector 413 may generate the output distribution signal ODST based on the table input signal TI and the activation function selection signal AF_SEL. The output distribution signal selector 413 may set a logic level combination of the output distribution signal ODST that corresponds to the table input signal TI based on an input range of the activation function that is selected by the activation function selection signal AF_SEL. The input range of the activation function may be based on the relative number of errors that occur.

An operation of the output distribution signal selector 413 will be described in more detail hereinafter with reference to FIG. 26.

It may be assumed that a first activation function, selected when the activation function selection signal AF_SEL is set to have a logic "low(0)" level, has relatively less errors in a first input range R1 and has relatively more errors in a second input range R2. In such a case, the output distribution signal selector 413 may select and output a first logic level combination ODST(1) of the output distribution signal ODST when one of the first to fourth bits TI<1:4> of the table input signal TI is activated in the first input range R1.

The output distribution signal selector 413 may increase the number of bits that are included in the table input signal TI that correspond to a logic level combination of the output distribution signal ODST in the first input range R1 as opposed to the second input range R2, thereby reducing the space required for the look-up table. In addition, in the second input range R2, the output distribution signal selector 413 may select and output a second logic level combination ODST(2) of the output distribution signal ODST when the fifth bit TI<5> of the table input signal TI is activated, may select and output a third logic level combination ODST(3) of the output distribution signal ODST when the sixth bit TI<6> of the table input signal TI is activated, may select and output a fourth logic level combination ODST(4) of the output distribution signal ODST when the seventh bit TI<7> of the table input signal TI is activated, and may select and output a fifth logic level combination ODST(5) of the output distribution signal ODST when the eighth bit TI<8> of the table input signal TI is activated. The output distribution signal selector 413 may reduce the number of bits that are included in the table input signal TI that corresponds to a logic level combination of the output distribution signal ODST in the second input range R2 as opposed to the first input range R1, thereby improving the accuracy of the activation function.

It may be assumed that a second activation function, selected when the activation function selection signal AF_SEL is set to have a logic "high(1)" level, has relatively more errors in the first input range R1 and has relatively less errors in the second input range R2. In such a case, in the first input range R1, the output distribution signal selector 413 may select and output the first logic level combination ODST(1) of the output distribution signal ODST when the first bit TI<1> of the table input signal TI is activated, may select and output the second logic level combination ODST(2) of the output distribution signal ODST when the second bit TI<2> of the table input signal TI is activated, may select and output the third logic level combination ODST(3) of the output distribution signal ODST when the third bit TI<3> of the table input signal TI is activated, and may select and output the fourth logic level combination ODST(4) of the output distribution signal ODST when the fourth bit TI<4> of the table input signal TI is activated. The output distribution signal selector 413 may reduce the number of bits that are included in the table input signal TI that correspond to a logic level combination of the output distribution signal ODST in the first input range R1 as opposed to the second input range R2, thereby improving the accuracy of the activation function. In addition, in the second input range R2, the output distribution signal selector 413 may select and output the fifth logic level combination ODST(5) of the output distribution signal ODST when one of the fifth and sixth bits TI<5:6> of the table input signal TI is activated and may select and output the sixth logic level combination ODST(6) of the output distribution signal ODST when one of the seventh and eighth bits TI<7:8> of the table input signal TI is activated. The output distribution signal selector 413 may increase the number of bits that are included in the table input signal TI that correspond to a logic level combination of the output distribution signal ODST in the second input range R2 as opposed to the first input range R1, thereby reducing the space required for the look-up table.

Figure 27:
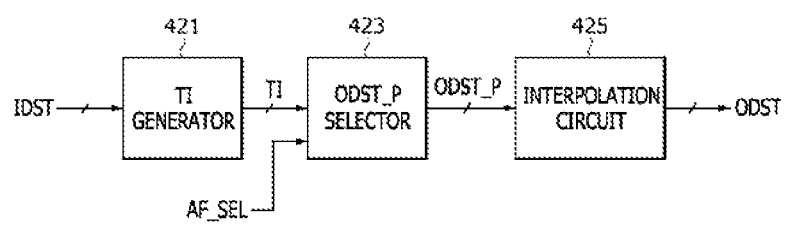
FIG. 27 is a block diagram illustrating a configuration of another example of an AF circuit included in the arithmetic device illustrated in FIG. 24.

As illustrated in FIG. 27, another AF circuit 409A may include a table input signal generator (TI GENERATOR) 421, a pre-output distribution signal selector (ODST_P SELECTOR) 423, and an interpolation circuit 425. The table input signal generator 421 and the pre-output distribution signal selector 423 may the same configurations as the table input signal generator 411 and the output distribution signal selector 413 that are illustrated in FIG. 25, respectively. Thus, detailed descriptions of the table input signal generator 421 and the pre-output distribution signal selector 423 will be omitted hereinafter. The interpolation circuit 425 may receive a pre-output distribution signal ODST_P from the pre-output distribution signal selector 423. The interpolation circuit 425 may use a first order approximation function or a second order approximation function and may interpolate the pre-output distribution signal ODST_P to generate the output distribution signal ODST. The AF circuit 409A, illustrated in FIG. 27, may include the interpolation circuit 425 to generate the output distribution signal ODST with reduced errors.

What is claimed is:

1. An arithmetic device comprising:
    a multiplying-accumulating (MAC) operator configured to perform a MAC arithmetic operation for weight data and vector data to generate an arithmetic result signal; and
    an activation function (AF) circuit configured to store a look-up table for an activation function, configured to adjust a number of logic level combinations of an input distribution signal that correspond to each logic level combination of the output distribution signal, among a plurality of logic level combinations of the output distribution signal, based on an input range of the activation function, and configured to select and output the output distribution signal that corresponds to the input distribution signal based on the look-up table,
    wherein the input range of the activation function is based on a relative number of errors that occur,
    wherein the input distribution signal is used to generate bits of a table input signal, and
    wherein, in the look-up table, a range of bits of the table input signal corresponds to each logic level combination of the output distribution signal.

2. The arithmetic device of claim 1, wherein the input distribution signal is extracted from the arithmetic result signal.

3. The arithmetic device of claim 1,
    wherein the input range of the activation function includes a first input range and a second input range; and
    wherein the number of errors that occur in the first input range is less than the number of errors that occur in the second input range.

4. The arithmetic device of claim 3, wherein, through the AF circuit, the number of the logic level combinations of the input distribution signal that correspond to the logic level combinations of the output distribution signal in the first input range is set to be greater than the number of the logic level combinations of the input distribution signal that correspond to the logic level combinations of the output distribution signal in the second input range.

5. The arithmetic device of claim 3, wherein, in the first input range, each of the logic level combinations of the output distribution signal corresponds to at least two of the logic level combinations of the input distribution signal.

6. The arithmetic device of claim 3, wherein, in the first input range, the AF circuit selects and outputs a first logic level combination of the output distribution signal when a first logic level combination or a second logic level combination of the input distribution signal is input to the AF circuit.

7. The arithmetic device of claim 6, wherein, in the second input range, the AF circuit selects and outputs a second logic level combination of the output distribution signal when a third logic level combination of the input distribution signal is input to the AF circuit.

8. The arithmetic device of claim 3, wherein the AF circuit includes:
    a table input signal generator configured to generate the table input signal based on the input distribution signal; and
    an output distribution signal selector configured to select and output one of the plurality of logic level combinations of the output distribution signal based on the table input signal in the first input range and the second input range.

9. The arithmetic device of claim 8, wherein the table input signal generator decodes the input distribution signal to generate the table input signal; and
wherein the table input signal generator selectively activates one of a plurality of bits that are included in the table input signal based on a logic level combination of the input distribution signal.

10. The arithmetic device of claim 8, wherein, the output distribution signal selector outputs the output distribution signal based on the look-up table, and
wherein, in the look-up table, the range of bits included in the table input signal that correspond to each logic level combination of the output distribution signal in the first input range is set to be greater than the range of bits included in the table input signal that correspond to each logic level combination of the output distribution signal in the second input range.

11. The arithmetic device of claim 8, wherein, in the first input range, each of the logic level combinations of the output distribution signal corresponds to at least two of a plurality of bits that are included in the table input signal.

12. The arithmetic device of claim 8, wherein the output distribution signal selector selects and outputs a first logic level combination of the output distribution signal when a first bit or a second bit of the table input signal is activated in the first input range.

13. The arithmetic device of claim 12, wherein the output distribution signal selector selects and outputs a second logic level combination of the output distribution signal when a third bit of the table input signal is activated in the second input range.

14. An arithmetic device comprising:
a multiplying-accumulating (MAC) operator configured to perform a MAC arithmetic operation for weight data and vector data to generate an arithmetic result signal; and
an activation function (AF) circuit configured to store a look-up table for an activation function, configured to adjust a number of logic level combinations of an input distribution signal that correspond to each logic level combinations of the output distribution signal, among a plurality of logic level combinations of the output distribution signal, based on an activation function selection signal and an input range of the activation function, and configured to select and output the output distribution signal that correspond to the input distribution signal based on the look-up table,
wherein the input range of the activation function is based on a relative number of errors that occur,
wherein the input distribution signal is used to generate bits of a table input signal, and
wherein, in the look-up table, a range of bits of the table input signal corresponds to each logic level combination of the output distribution signal.

15. The arithmetic device of claim 14, wherein the input range of the activation function includes a first input range and a second input range; and
wherein the activation function, applied to the look-up table, selected when the activation function selection signal has a first logic level, corresponds to a first activation function in which the number of errors that occur in the first input range is less than the number of errors that occur in the second input range.

16. The arithmetic device of claim 15, through the AF circuit, wherein the number of the logic level combinations of the input distribution signal that correspond to the logic level combinations of the output distribution signal in the first input range is set to be greater than the number of the logic level combinations of the input distribution signal that correspond to the logic level combinations of the output distribution signal in the second input range.

17. The arithmetic device of claim 15, wherein, in the first input range, each of the logic level combinations of the output distribution signal corresponds to at least two of the logic level combinations of the input distribution signal.

18. The arithmetic device of claim 15, wherein, in the first input range, the AF circuit selects and outputs a first logic level combination of the output distribution signal when a first logic level combination or a second logic level combination of the input distribution signal is input to the AF circuit.

19. The arithmetic device of claim 18, wherein, in the second input range, the AF circuit selects and outputs a second logic level combination of the output distribution signal when a third logic level combination of the input distribution signal is input to the AF circuit.

20. The arithmetic device of claim 14, wherein the input range of the activation function includes a first input range and a second input range; and
wherein the activation function, applied to the look-up table, selected when the activation function selection signal has a second logic level, corresponds to a second activation function in which the number of errors that occur in the first input range is greater than the number of errors that occur in the second input range.

21. The arithmetic device of claim 20, wherein, through the AF circuit, the number of the logic level combinations of the input distribution signal that correspond to the logic level combinations of the output distribution signal in the first input range is set to be less than the number of the logic level combinations of the input distribution signal that correspond to the logic level combinations of the output distribution signal in the second input range.

22. The arithmetic device of claim 20, wherein, in the second input range, each of the logic level combinations of the output distribution signal corresponds to at least two of the logic level combinations of the input distribution signal.

23. The arithmetic device of claim 20, wherein, in the second input range, the AF circuit selects and outputs a first logic level combination of the output distribution signal when a first logic level combination or a second logic level combination of the input distribution signal is input to the AF circuit.

24. The arithmetic device of claim 23, wherein, in the first input range, the AF circuit selects and outputs a second logic level combination of the output distribution signal when a third logic level combination of the input distribution signal is input to the AF circuit.

* * * * *